(12) United States Patent
Palmquist

(10) Patent No.: US 10,918,457 B2
(45) Date of Patent: Feb. 16, 2021

(54) ELECTRIC DENTAL HANDPIECE AND WEARABLE CONTROLLER

(71) Applicant: Collin C. Palmquist, Watertown, SD (US)

(72) Inventor: Collin C. Palmquist, Watertown, SD (US)

( * ) Notice: Subject to any disclaimer, the term of this patent is extended or adjusted under 35 U.S.C. 154(b) by 0 days.

(21) Appl. No.: 16/970,857

(22) PCT Filed: Aug. 6, 2019

(86) PCT No.: PCT/US2019/045320
§ 371 (c)(1),
(2) Date: Aug. 18, 2020

(87) PCT Pub. No.: WO2020/033417
PCT Pub. Date: Feb. 13, 2020

(65) Prior Publication Data
US 2021/0000569 A1 Jan. 7, 2021

Related U.S. Application Data

(60) Provisional application No. 62/715,443, filed on Aug. 7, 2018.

(51) Int. Cl.
*A61C 1/06* (2006.01)
*A61C 1/14* (2006.01)
*A61C 1/00* (2006.01)

(52) U.S. Cl.
CPC .............. *A61C 1/06* (2013.01); *A61C 1/0053* (2013.01); *A61C 1/14* (2013.01); *A61C 2204/002* (2013.01)

(58) Field of Classification Search
CPC ............ A61C 1/06; A61C 1/14; A61C 1/0053; A61C 1/0084; A61C 1/0092; A61C 2204/002
(Continued)

(56) References Cited

U.S. PATENT DOCUMENTS 7,002,469 B2 * 2/2006 Siemons ................ A61C 19/00
340/12.54
9,827,060 B2 * 11/2017 Jagga ..................... A61B 90/37
(Continued)

FOREIGN PATENT DOCUMENTS

| WO | 2008/093345 | 8/2008 |
| WO | 2017/204757 | 11/2017 |
| WO | 2018/125365 | 7/2018 |

OTHER PUBLICATIONS

International Search Report and Written Opinion issued in International Application No. PCT/US2019/045320, dated Nov. 11, 2019, 7 pages.

*Primary Examiner* — Matthew M Nelson
(74) *Attorney, Agent, or Firm* — Hamre, Schumann, Mueller & Larson, P.C.

(57) ABSTRACT

A wearable controller for a dental handpiece system and a dental handpiece system are disclosed. The wearable controller includes a wearable body. The wearable body includes an input and a display, the input and the display for displaying a graphical user interface (GUI) to an operator providing a plurality of operating selections. A battery is electrically connected to the input and the display for powering the input and the display. A reservoir is secured to the wearable body. An output is electrically connected to the input and the display for receiving an indication of an alert.

20 Claims, 2 Drawing Sheets

(58) Field of Classification Search
USPC .......................................................... 433/131
See application file for complete search history.

(56) References Cited

U.S. PATENT DOCUMENTS

| | | | |
|---|---|---|---|
| 10,213,272 B2 * | 2/2019 | Pond ..................... | B06B 1/0207 |
| 10,610,309 B2 * | 4/2020 | Schrock ............... | A61C 1/0015 |
| 2004/0224279 A1 * | 11/2004 | Siemons .............. | A61C 1/0015 |
| | | | 433/29 |
| 2005/0058962 A1 * | 3/2005 | Siemons ............... | A61C 19/00 |
| | | | 433/27 |
| 2011/0229839 A1 * | 9/2011 | Yamashita ............. | A61B 5/053 |
| | | | 433/27 |
| 2013/0236851 A1 * | 9/2013 | McDonough ...... | A61C 17/0211 |
| | | | 433/89 |
| 2013/0273494 A1 * | 10/2013 | Boutoussov ........... | A61C 17/02 |
| | | | 433/29 |
| 2015/0188023 A1 * | 7/2015 | Pond ....................... | A61C 1/07 |
| | | | 433/86 |
| 2016/0324596 A1 * | 11/2016 | Pond ..................... | B06B 1/0207 |
| 2016/0367326 A1 * | 12/2016 | Schrock ............... | A61C 1/0007 |
| 2018/0307797 A1 * | 10/2018 | St. Louis ................ | G01H 17/00 |
| 2019/0183619 A1 * | 6/2019 | Reizenson ........... | A61C 1/0084 |

* cited by examiner

ELECTRIC DENTAL HANDPIECE AND WEARABLE CONTROLLER

FIELD

This disclosure is directed generally to dental equipment such as, but not limited to, dental drills. More specifically, this disclosure is directed to an electric dental handpiece having a wearable controller.

BACKGROUND

Dental handpieces, such as a dental drill, typically utilize a compressor system. The drills are typically referred to as air turbine dental drills. These drills require a tube or tubes to be connected to the compressor system. These tubes are distributed throughout a dental office. Additionally, the air turbine dental drills, when operated, produce a high-pitched noise that can be annoying to the patients.

Improved dental handpieces and corresponding portable systems are desirable.

SUMMARY

This disclosure is directed generally to dental equipment such as, but not limited to, dental drills. More specifically, this disclosure is directed to an electric dental handpiece having a wearable controller.

In an embodiment, the wearable controller can be wearable on a wrist or forearm of an operator. In an embodiment, the wearable controller can be wearable on a location other than the wrist or forearm such as, but not limited to, an upper arm, a hip, a clothes pocket, a leg, or the like.

A system is disclosed. The system includes a dental handpiece; a wearable controller; and a conduit connecting the wearable controller and the dental handpiece.

In an embodiment, the dental handpiece is electric powered. In an embodiment, the electric powered dental handpiece is battery-powered.

In an embodiment, the dental handpiece includes a light for illuminating an operating field of the user. In an embodiment, the light is a light emitting diode (LED).

In an embodiment, the wearable controller includes a fluid reservoir and the conduit fluidly connects the dental handpiece and the fluid reservoir. In an embodiment, the fluid reservoir is removable from the wearable controller.

In an embodiment, the wearable controller includes an air inlet and the conduit fluidly connects the dental handpiece and the air inlet.

In an embodiment, the wearable controller includes a display and an input. In an embodiment, the wearable controller includes a display and an input integrated with the display.

In an embodiment, the wearable controller includes an output configured to generate a vibration. In an embodiment, the output can be, for example, a motor or the like that can be activated to cause a vibration of the wearable controller.

A wearable controller for a dental handpiece system is disclosed. The wearable controller includes a wearable body. The wearable body includes an input and a display, the input and the display for displaying a graphical user interface (GUI) to an operator providing a plurality of operating selections. A battery is electrically connected to the input and the display for powering the input and the display. A reservoir is secured to the wearable body. An output is electrically connected to the input and the display for receiving an indication of an alert.

BRIEF DESCRIPTION OF THE DRAWINGS

References are made to the accompanying drawings that form a part of this disclosure, and which illustrate embodiments in which the systems and methods described in this Specification can be practiced.

Like reference numbers represent like parts throughout.

DETAILED DESCRIPTION

This disclosure is directed generally to dental equipment such as, but not limited to, dental drills. More specifically, this disclosure is directed to an electric dental handpiece having a wearable controller.

Figure 1:
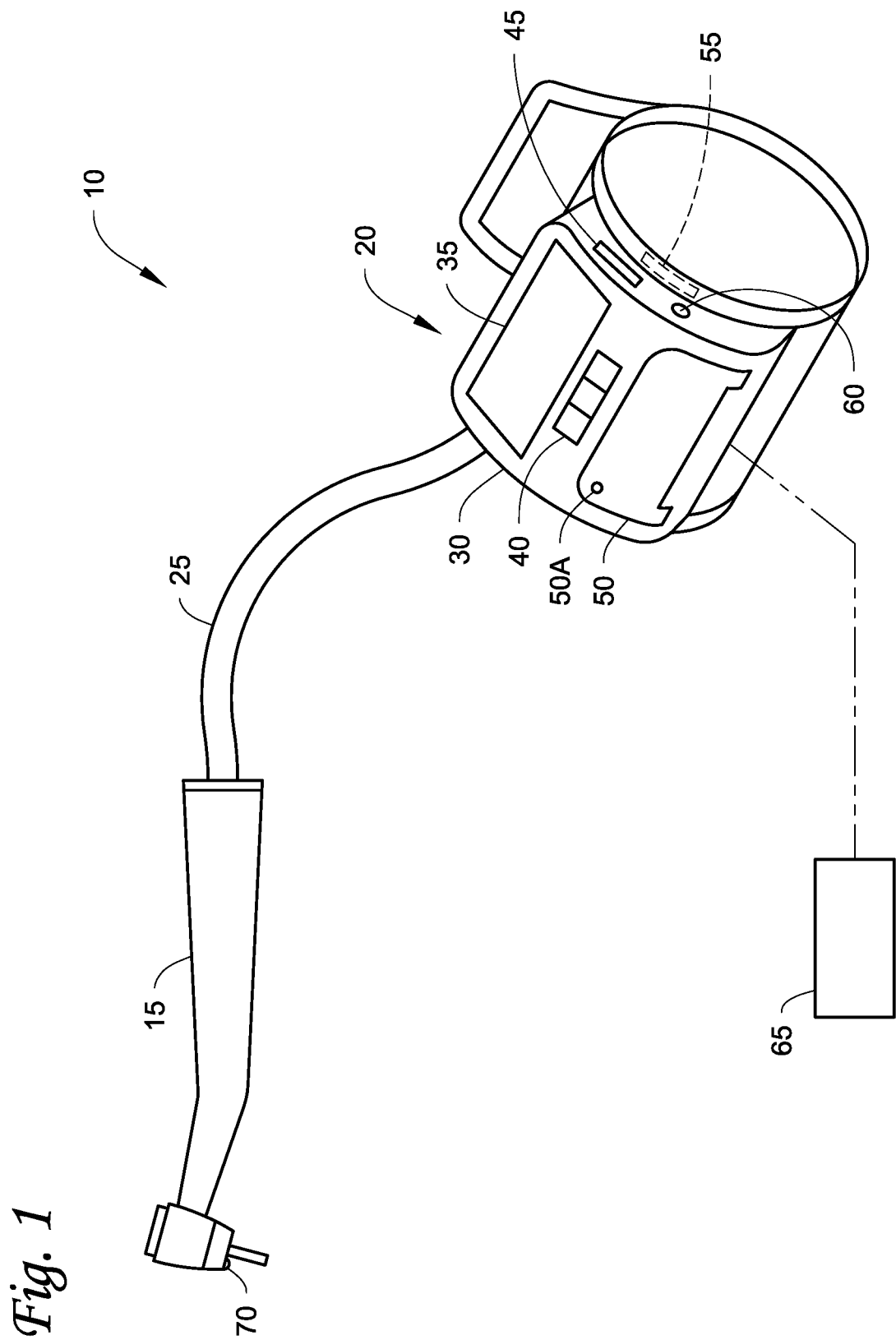
FIG. 1 is a schematic diagram of a dental handpiece system, according to an embodiment.

FIG. 1 is a schematic diagram of a dental handpiece system 10, according to an embodiment. The dental handpiece system 10 is an electric dental handpiece system that includes a wearable controller 20 and an electric dental handpiece 15. In an embodiment, the dental handpiece system 10 is representative of a dental handpiece system that includes the handpiece 15 such as, but not limited to, a dental drill.

The dental handpiece system 10 may be representative of a system that could be utilized by a dentist (or other dental professional) to, for example, perform a dental procedure such as, but not limited to, removal of silver amalgam; composite restoration removal; preparation of a previously non-restored natural tooth crown; removal of a non-precious metal crown; removal of ceramic, porcelain crown, inlay, or onlay; preparation of a previously non-restored cavity; low speed decay removal; low speed restoration polish; low speed enamelplasty; or the like. It will be appreciated that this list is exemplary and that the dental handpiece system 10 can have one or more fewer or additional uses.

The dental handpiece system 10 includes the dental handpiece 15, the wearable controller 20, and a conduit 25. The conduit 25 removably connects the dental handpiece 15 and the wearable controller 20. In an embodiment, the conduit 25 may utilize a connection that is connectable and removable without use of additional tools so that, for example, the dental handpiece 15 can be changed prior to a procedure or during a procedure. For example, if a different dental handpiece 15 is needed or desired, an issue occurs with the current dental handpiece 15, or the like, the dental handpiece 15 may be changeable without tools. Similarly, the wearable controller 20 may be swappable in the same manner.

The dental handpiece 15 is an electric dental handpiece that is powered by a battery. In an embodiment, the battery can be disposed in the wearable controller 20. In an embodiment, the battery can be disposed in the dental handpiece 15. The battery is generally removable for recharging. The dental handpiece 15 is generally representative of a multi-speed handpiece. That is, the dental handpiece 15 may be operated at a low speed or a high speed. In an embodiment, the dental handpiece 15 may be operated at one or more intermediate speeds between the low speed and the high speed. In an embodiment, high speed can be, for example, between at or about 150,000—at or about 200,000 revolutions per minute (RPM). In general, high speed can be less than at or about 400,000 RPM. In an embodiment, low speed can be less than at or about 40,000 RPM. It will be appreciated that these numbers are exemplary and high speed or low speed can vary beyond the stated values. It will be appreciated that the disclosure herein is applicable to a single speed dental handpiece as well.

The dental handpiece 15 includes a light 70. The light 70 can be disposed in a location at which the light will illuminate a working area of the user of the dental handpiece 15. In an embodiment, the light 70 can be a light emitting diode (LED) or the like.

The conduit 25 can contain a plurality of conduits therein. For example, the reservoir 50, which can be filled to include a cooling irrigant (e.g., water, etc.), may have a conduit disposed within conduit 25 that provides the cooling irrigant to the dental handpiece 15. In an embodiment, the conduit 25 may be a single conduit that fluidly connects the reservoir 50 and the dental handpiece 15. In operation, the irrigant may be provided via the dental handpiece 15 during a dental procedure. The wearable controller 20 can include a small pump or the like to provide the irrigant from the reservoir 50 to the dental handpiece 15. In an embodiment, such a pump can be disposed at or near the dental handpiece 15. In an embodiment, the small pump can be disposed in or near the reservoir 50.

The wearable controller 20 generally includes a wearable body 30, display 35, input 40, battery 45, reservoir 50, output 55, and air inlet 60. It will be appreciated that one or more of the features of the wearable controller 20 may be optional, according to an embodiment. For example, in an embodiment, the air inlet 60 may not be present. In an embodiment, one or more additional features can be included.

In an embodiment, the wearable controller 20 may have a particular orientation so that the wearable controller 20 is suitable for a right-handed operator or a left-handed operator. In an embodiment, the wearable controller 20 may be orientation agnostic so that, for example, a left-handed operator and a right-handed operator can use the same wearable controller 20.

The wearable controller 20 provides the display 35 and input 40 so that an operator can select various controls for the dental handpiece 15. In an embodiment, the wearable controller 20 and the dental handpiece 15 may be in electric communication via a wire through the conduit 25. In an embodiment, the wearable controller 20 and the dental handpiece 15 may be in wireless communication.

Via a variety of menu options on the display 35, the operator may configure one or more operating parameters for the dental handpiece 15. In an embodiment, the wearable controller 20 may include options associated with predefined parameters (e.g., operating speed, pressure, etc.) for the dental handpiece 15. For example, operating parameters may be those typically associated with various dental procedures such as, but not limited to, removal of silver amalgam; composite restoration removal; preparation of a previously non-restored natural tooth crown; removal of a non-precious metal crown; removal of ceramic, porcelain crown, inlay, or onlay; preparation of a previously non-restored cavity; low speed decay removal; low speed restoration polish; low speed enamelplasty; or the like. In an embodiment, the settings may be configurable by the operator. In an embodiment, the operating parameters may be selected at a time of manufacture based on, for example, best practices in dentistry, standards, or the like.

The wearable controller 20 may also be configured to receive feedback from the dental handpiece 15. For example, the dental handpiece 15 may incorporate force sensors, temperature sensors, or the like. In such an embodiment, the operating parameters may define temperature limits and pressure limits. Accordingly, if the limits are exceeded, an alert may be generated by the wearable controller 20. The alert may cause the output 55 to provide an audible or vibratory alert to the operator via the output 55.

The wearable controller 20 generally includes a processor, a memory, storage, and a network input/output. The processor can retrieve and execute programming instructions stored in the memory and/or the storage. The processor can also store and retrieve application data residing in the memory. The processor can be a single processor, multiple processors, or a single processor having multiple processing cores. In an embodiment, the processor can be a single-threaded processor. In an embodiment, the processor can be a multi-threaded processor. The memory is generally included to be representative of a random access memory such as, but not limited to, Static Random Access Memory (SRAM), Dynamic Random Access Memory (DRAM), or Flash. In an embodiment, the memory can be a volatile memory. In an embodiment, the memory can be a non-volatile memory. In an embodiment, at least a portion of the memory can be virtual memory. The storage is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In an embodiment, the storage is a computer readable medium. In an embodiment, the storage can include storage that is external to the computer device, such as in a cloud. The network I/O is configured to transmit data via a network. The network may alternatively be referred to as the communications network. Examples of the network include, but are not limited to, a local area network (LAN), a wide area network (WAN), the Internet, or the like. In an embodiment, the network I/O can transmit data via the network through a wireless connection using Wi-Fi, Bluetooth, or other similar wireless communication protocols. In an embodiment, the wearable controller 20 can transmit data via the network through a cellular, 3G, 4G, or other wireless protocol.

The wearable body 30 can be a rigid or semi-rigid structure. In an embodiment, the wearable body 30 can be made of a suitable lightweight material. Examples of suitable materials include, for example, carbon fiber or the like. It will be appreciated that other lightweight materials may provide sufficient rigidity for the wearable body 30. In an embodiment, an overall weight of the wearable body 30 is limited so that the wearable controller 20 does not interfere with the operator's motion during a procedure. In an embodiment, the wearable body 30 may also include an adjustable fastener. The adjustable fastener can include, for example, Velcro, a snap, a buckle, a button, a plurality of buttons, combinations thereof, or the like. The adjustable fastener may be secured to a fabric that is secured to the wearable body 30.

The display 35 can include any of a variety of display devices suitable for displaying information to the user. Examples of devices suitable for the display 35 include, but are not limited to, a liquid crystal display (LCD), a light emitting diode (LED) display, or the like. The display 35 can be used, for example, to display feedback to the user such as, but not limited to, average pressure, runtime, current RPM, or the like. It will be appreciated that this list is an example and that additional information can be displayed in accordance with the principles described in this Specification.

The input 40 can include any of a variety of input devices or input means suitable for receiving an input from the user. Examples of devices suitable for the input 40 include, but are not limited to, a button or the like. In an embodiment, the input 40 can be integrated with the display 35 such that both input and output are performed by the display 35. Such an embodiment is shown and described in accordance with FIG. 2 below.

In the illustrated embodiment, the input 40 includes three buttons. It will be appreciated that the number of buttons may vary beyond three. In an embodiment that includes three buttons, one of the buttons may be a power/menu button and the other two buttons may be an up button and a down button for scrolling through various commands or options on the display 35. In an embodiment, the power/menu button may also be used for making a selection.

The battery 45 is a rechargeable battery. The battery 45 can be removable from the wearable controller 20. In an embodiment, the battery 45 can be charged when installed to the wearable controller 20. In an embodiment, the battery 45 can be charged after being removed from the wearable controller 20. The battery 45 may be representative of, for example, a lithium-ion battery or the like.

The reservoir 50 is a fluid reservoir for receiving a cooling irrigant (e.g., water, etc.). The reservoir 50 can store from at or about 2 ounces to at or about 3 ounces of fluid. In an embodiment, the reservoir 50 can store at or about 2.5 ounces of fluid. The reservoir 50 is removable from the wearable controller 20. This can enable cleaning, replacement, or the like. The reservoir 50 can include a port 50A. The port 50A can be referred to as the "quick fill" port 50A or the like. The port 50A enables refilling of the reservoir 50 even when the wearable controller 20 is on the operator's arm (e.g., during a procedure). As such, an assistant or the like can refill the reservoir without delaying the procedure.

The reservoir 50 also contains a lid via which a tablet may be insertable into the reservoir 50. For example, an effervescent tablet may be placed into the reservoir 50. The tablet can assist in neutralizing an unpleasant taste that often accompanies intraoral dental procedures. The tablet can also have antibacterial properties that will destroy and/or suppress cariogenic bacteria. In an embodiment, the tablet can contain xylitol or the like.

The output 55 may be a speaker, a vibrator, or the like. In an embodiment, the output 55 can be a speaker and a vibrator. The output 55 can receive an electric alert signal from the wearable controller 20. In response to the alert signal, the output 55 generates a sound or a vibration to alert the operator of, for example, an excessive temperature, an excessive pressure, a low battery, or the like.

The air inlet 60 may receive a pressurized air container. The air inlet 60 is in fluid communication with the dental handpiece 15. In an embodiment, the pressurized air can be used to provide chip air. "Chip air," as used in this Specification, generally refers to an airflow used to clear debris during a dental procedure. It will be appreciated that the air inlet 60 may be optional. In embodiments that include the air inlet 60, the dental handpiece system 10 is fully operable even if no pressurized air container is connected to the wearable controller 20.

A foot controller 65 may be wirelessly connected to the wearable controller 20 and the dental handpiece 15. Generally, the foot controller 65 may utilize a rheostat to control a speed of the dental handpiece 15. In an embodiment, the parameters selected from a preset procedure selection menu using the wearable controller 20 may, for example, limit speeds at which the operator can control the dental handpiece 15 via the foot controller 65.

Figure 2:
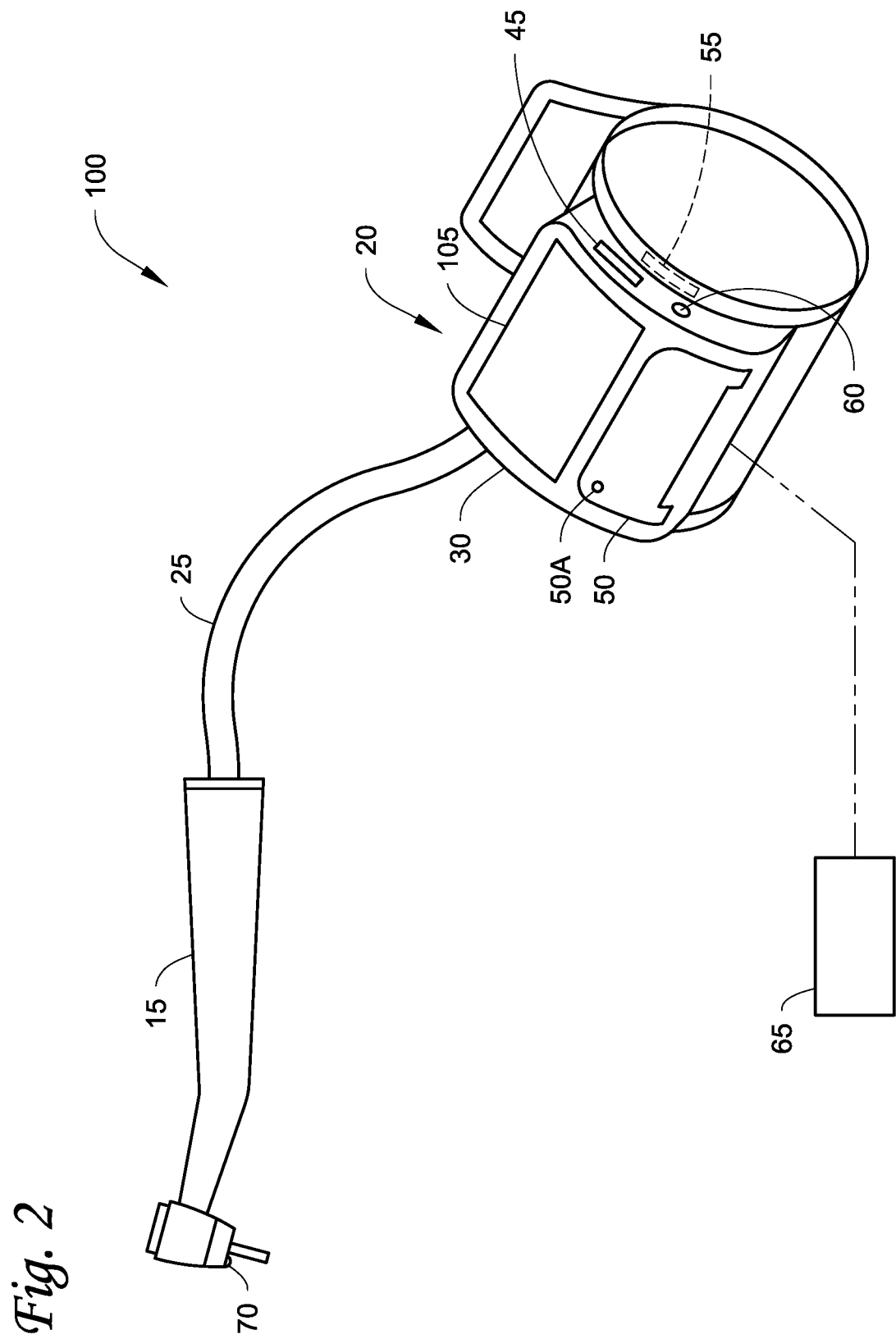
FIG. 2 is a schematic diagram of a dental handpiece system, according to an embodiment.

FIG. 2 is a schematic diagram of a dental handpiece system 100, according to an embodiment. The dental handpiece system 100 is similar to the dental handpiece system 10 in FIG. 1. For simplicity of this Specification, features which are the same are labeled with like reference numbers and are not described in further detail.

The dental handpiece system 100 generally varies from the dental handpiece system 10 in FIG. 1 in that the wearable controller 20 includes a touchscreen display 105. The touchscreen display incorporates the display 35 (FIG. 1) and the input 40 (FIG. 1) into the single touchscreen display 105. In an embodiment, the touchscreen display 105 may provide additional menu options instead of having three buttons (FIG. 1). The touchscreen display 105 can be a color display or a black and white display.

The touchscreen display 105 can include any of a variety of input devices or input means suitable for receiving an input from the user. Examples of devices suitable for the input include, but are not limited to, a voice command, a proximity sensor, an ocular sensing device for determining an input based on eye movements (e.g., scrolling based on an eye movement), or the like.

Aspects. It is to be appreciated that any of aspects 1-12 can be combined with any of aspects 13-20.

Aspect 1. A system, comprising: a dental handpiece; a wearable controller including a fluid reservoir and a battery; and a conduit connecting the wearable controller and the dental handpiece, the conduit providing fluid communication between the dental handpiece and the fluid reservoir.

Aspect 2. The system of aspect 1, wherein the dental handpiece is electric powered.

Aspect 3. The system of one of aspects 1 or 2, wherein the conduit is configured to receive fluid from the fluid reservoir and provide fluid to an outlet of the dental handpiece.

Aspect 4. The system of any of aspects 1-3, wherein the fluid reservoir is removable from the wearable controller.

Aspect 5. The system of any of aspects 1-4, wherein the wearable controller includes an air inlet and the conduit fluidly connects the dental handpiece and the air inlet.

Aspect 6. The system of any of aspects 1-5, wherein the wearable controller includes a display and an input.

Aspect 7. The system of any of aspects 1-6, wherein the wearable controller includes a display and an input integrated with the display.

Aspect 8. The system of any of aspects 1-7, wherein the wearable controller includes an output configured to generate a vibration.

Aspect 9. The system of any of aspects 1-8, wherein the wearable controller is configured to include a plurality of settings corresponding to plurality of dental procedures.

Aspect 10. The system of any of aspects 1-9, wherein the battery is removable.

Aspect 11. The system of any of aspects 1-10, wherein the dental handpiece is an electric drill.

Aspect 12. A wearable controller for a dental handpiece system, comprising: a wearable body including: an input and a display, the input and the display for displaying a graphical user interface (GUI) to an operator providing a plurality of operating selections; a battery electrically connected to the input and the display for powering the input and the display; a reservoir; and an output electrically connected to the input and the display for receiving an indication of an alert.

Aspect 13. The wearable controller of aspect 12, wherein the input and the display are combined as a touchscreen display.

Aspect 14. The wearable controller of one of aspects 12 or 13, wherein the output is one of a vibrator and a speaker.

Aspect 15. The wearable controller of any of aspects 12-14, wherein the reservoir is removably connected to the wearable body.

Aspect 16. The wearable controller of any of aspects 12-15, wherein the reservoir includes a quick fill port for filling the reservoir when installed on the wearable body.

Aspect 17. The wearable controller of any of aspects 12-16, wherein the input includes three buttons.

Aspect 18. The wearable controller of any of aspects 12-17, further comprising an air inlet.

Aspect 19. The wearable controller of any of aspects 12-18, wherein the reservoir holds from at or about 2 ounces to at or about 3 ounces of fluid.

Aspect 20. The wearable controller of any of aspects 12-19, wherein the reservoir includes a lid for receiving a tablet.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A system, comprising:
   a dental handpiece;
   a wearable controller including a fluid reservoir and a battery; and
   a conduit connecting the wearable controller and the dental handpiece, the conduit providing fluid communication between the dental handpiece and the fluid reservoir.

2. The system of claim 1, wherein the dental handpiece is electric powered.

3. The system of claim 1, wherein the conduit is configured to receive fluid from the fluid reservoir and provide fluid to an outlet of the dental handpiece.

4. The system of claim 1, wherein the fluid reservoir is removable from the wearable controller.

5. The system of claim 1, wherein the wearable controller includes an air inlet and the conduit fluidly connects the dental handpiece and the air inlet.

6. The system of claim 1, wherein the wearable controller includes a display and an input.

7. The system of claim 1, wherein the wearable controller includes a display and an input integrated with the display.

8. The system of claim 1, wherein the wearable controller includes an output configured to generate a vibration.

9. The system of claim 1, wherein the wearable controller is configured to include a plurality of settings corresponding to plurality of dental procedures.

10. The system of claim 1, wherein the battery is removable.

11. The system of claim 1, wherein the dental handpiece is an electric drill.

12. A wearable controller for a dental handpiece system, comprising:
    a wearable body including:
       an input and a display, the input and the display for displaying a graphical user interface (GUI) to an operator providing a plurality of operating selections;
       a battery electrically connected to the input and the display for powering the input and the display;
       a reservoir; and
       an output electrically connected to the input and the display for receiving an indication of an alert.

13. The wearable controller of claim 12, wherein the input and the display are combined as a touchscreen display.

14. The wearable controller of claim 12, wherein the output is one of a vibrator and a speaker.

15. The wearable controller of claim 12, wherein the reservoir is removably connected to the wearable body.

16. The wearable controller of claim 12, wherein the reservoir includes a quick fill port for filling the reservoir when installed on the wearable body.

17. The wearable controller of claim 12, wherein the input includes three buttons.

18. The wearable controller of claim 12, further comprising an air inlet.

19. The wearable controller of claim 12, wherein the reservoir holds from at or about 2 ounces to at or about 3 ounces of fluid.

20. The wearable controller of claim 12, wherein the reservoir includes a lid for receiving a tablet.

* * * * *